(12) United States Patent
Kolesinski et al.

(10) Patent No.: US 11,514,804 B2
(45) Date of Patent: Nov. 29, 2022

(54) COMBINING TAXI SIGNAGE GENERATED FROM AIRPORT SURFACE ROUTING NETWORK DATA

(71) Applicant: Rockwell Collins, Inc., Cedar Rapids, IA (US)

(72) Inventors: Marcin Kolesinski, Central City, IA (US); Roger L. Yum, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 445 days.

(21) Appl. No.: 16/674,959

(22) Filed: Nov. 5, 2019

(65) Prior Publication Data

US 2021/0398436 A1    Dec. 23, 2021

(51) Int. Cl.
  *G08G 5/06*    (2006.01)
  *G08G 5/00*    (2006.01)
  *H04W 4/02*    (2018.01)

(52) U.S. Cl.
  CPC .......... *G08G 5/065* (2013.01); *G08G 5/0026* (2013.01); *H04W 4/026* (2013.01)

(58) Field of Classification Search
  None
  See application file for complete search history.

(56) References Cited

U.S. PATENT DOCUMENTS

| | | |
|---|---|---|
| 7,974,773 B1 | 7/2011 | Krenz et al. |
| 8,560,214 B1 | 10/2013 | Krenz et al. |
| 8,786,467 B2 | 7/2014 | Clark et al. |
| 9,000,952 B1 | 4/2015 | Vanderkamp et al. |

(Continued)

FOREIGN PATENT DOCUMENTS

EP    2584550 A2    4/2013

OTHER PUBLICATIONS

U.S. Department of Transportation—Federal Aviation Administration, Advisory Circular—Standards for Airport Sign Systems, 150/5340-18F (Year: 2010).*

(Continued)

*Primary Examiner* — Adam D Tissot
*Assistant Examiner* — Garrett F Evans
(74) *Attorney, Agent, or Firm* — Suiter Swantz pc llo

(57) ABSTRACT

Combined taxi signage may be generated from taxi signage for a first origination node and taxi signage for a second origination node, the first origination node and the second origination node being of a select proximity and orientation relative to an aircraft. The taxi signage for the first origination node may be generated from the first origination node and at least a first termination node stored within an airport surface routing network data, and a first turning angle determined based on a comparison between the first origination node and the at least the first termination node. The taxi signage for the second origination node may be generated from the second origination node and at least a second termination node stored within the airport surface routing network data, and a second turning angle determined based on a comparison between the second origination node and the at least the second termination node. The combined taxi signage may be included in a combined billboard displayed on the display device of the aircraft.

15 Claims, 7 Drawing Sheets

(56) References Cited

U.S. PATENT DOCUMENTS

| | | |
|---|---|---|
| 9,517,844 B2 | 12/2016 | Khatwa et al. |
| 9,718,558 B2 | 8/2017 | Ball et al. |
| 2010/0194601 A1 | 8/2010 | Servantie et al. |
| 2010/0211237 A1* | 8/2010 | Nichols ............... G08G 5/0086 701/14 |
| 2010/0250030 A1 | 9/2010 | Nichols et al. |
| 2011/0125400 A1 | 5/2011 | Michel et al. |
| 2011/0196598 A1* | 8/2011 | Feyereisen ............ G01C 23/00 701/120 |
| 2013/0179060 A1* | 7/2013 | Marczi .................. G08G 5/065 701/120 |
| 2013/0231853 A1 | 9/2013 | Feyereisen et al. |
| 2014/0303815 A1 | 10/2014 | Lafon et al. |

OTHER PUBLICATIONS

Extended Search Report for European Application No. 20206024.0 dated Mar. 30, 2021, 8 pages.

* cited by examiner

COMBINING TAXI SIGNAGE GENERATED FROM AIRPORT SURFACE ROUTING NETWORK DATA

BACKGROUND

Aircraft employ synthetic vision systems (SVS) in low-visibility situations to assist in determining the location of the aircraft during taxiing. A low-visibility situation may prevent crew members from being able to see taxi signage at airport movement surface intersections via line-of-sight through the windows during taxiing.

SUMMARY

Combined taxi signage configured to be displayed on a display device of an aircraft is disclosed, in accordance with one or more embodiments of the disclosure. The combined taxi signage may be generated from taxi signage for a first origination node and taxi signage for a second origination node. The taxi signage for the first origination node may be generated from the first origination node stored within airport surface routing network data. The first origination node may be within a select proximity and a select orientation relative to a location of the aircraft. The taxi signage for the first origination node may be generated from at least a first termination node stored within the airport surface routing network data. The at least the first termination node may be coupled to the first origination node via at least a first edge. The at least the first edge may be stored within the airport surface routing network data. The taxi signage for the first origination node may be generated from a first turning angle determined based on a comparison between the first origination node and the at least the first termination node. The taxi signage for the second origination node may be generated from the second origination node stored within the airport surface routing network data. The second origination node may be within the select proximity and the select orientation relative to the location of the aircraft. The taxi signage for the second origination node may be generated from at least a second termination node stored within the airport surface routing network data. The at least the second termination node may be coupled to the second origination node via at least a second edge. The at least the second edge may be stored within the airport surface routing network data. The taxi signage for the second origination node may be generated from a second turning angle determined based on a comparison between the second origination node and the at least the second termination node. The combined taxi signage may be included in a combined billboard displayed on the display device of the aircraft.

A method is disclosed, in accordance with one or more embodiments of the disclosure. The method may include, but is not limited to, generating taxi signage for a first origination node. Generating the taxi signage for the first origination mode may include, but is not limited to, determining a first origination node stored within airport surface routing network data. The first origination node may be within a select proximity and a select orientation relative to a location of an aircraft. Generating the taxi signage for the first origination mode may include, but is not limited to, determining at least a first termination node stored within the airport surface routing network data. The at least the first termination node may be coupled to the first origination node via at least a first edge. The at least the first edge may be stored within the airport surface routing network data. Generating the taxi signage for the first origination mode may include, but is not limited to, determining a first turning angle based on a comparison between the first origination node and the at least the first termination node. The method may include, but is not limited to, generating taxi signage for a second origination node. Generating the taxi signage for the second origination mode may include, but is not limited to, determining a second origination node stored within the airport surface routing network data. The second origination node may be within the select proximity and the select orientation relative to the location of the aircraft. Generating the taxi signage for the second origination mode may include, but is not limited to, determining at least a second termination node stored within the airport surface routing network data. The at least the second termination node may be coupled to the second origination node via at least a second edge. The at least the second edge may be stored within the airport surface routing network data. Generating the taxi signage for the second origination mode may include, but is not limited to, determining a second turning angle based on a comparison between the second origination node and the at least the second termination node. The method may include, but is not limited to, generating a combined taxi signage from the taxi signage for the first origination node and the taxi signage for the second origination node. The method may include, but is not limited to, displaying a combined billboard including the combined taxi signage on a display device of the aircraft.

In some embodiments, the generating the combined taxi signage may include, but is not limited to, automatically combining the taxi signage for the first origination node and the taxi signage for the second origination node.

In some embodiments, the method may include, but is not limited to, displaying a first billboard including the taxi signage for the first origination node on the display device of the aircraft. The method may include, but is not limited to, displaying a second billboard including the taxi signage for the second origination node on the display device of the aircraft.

In some embodiments, the generating the combined taxi signage may include, but is not limited to, combining the taxi signage for the first origination node and the taxi signage for the second origination node following an input being received via at least one input device of the aircraft.

In some embodiments, the first origination node and second origination node being located along a current pathway as defined by a heading of the aircraft.

In some embodiments, the combined taxi signage may include an origination portion, the origination portion including at least one alphanumeric character having a first color set within a space having a second color. The space may have the second color being bounded by an outline having the first color.

In some embodiments, the at least one alphanumeric character may correspond to information about the second origination node stored within the airport service network data.

In some embodiments, the at least one alphanumeric character may correspond to information about the first origination node stored within the airport service network data.

In some embodiments, the combined taxi signage may include at least a first termination portion. The at least the first termination portion may include at least one alphanumeric character having the second color set within a space having the first color. The space may have the first color being bounded by an outline having the second color.

In some embodiments, the at least one alphanumeric may correspond to information about the at least the first termination node stored within the airport service network data.

In some embodiments, the at least one alphanumeric may correspond to information about the at least the second termination node stored within the airport service network data.

In some embodiments, the taxi signage may include at least one arrow set within the space of the first color, the at least one arrow having the second color.

In some embodiments, a direction of the at least one arrow may be selected based on the first turning angle.

In some embodiments, a direction of the at least one arrow may be selected based on the second turning angle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
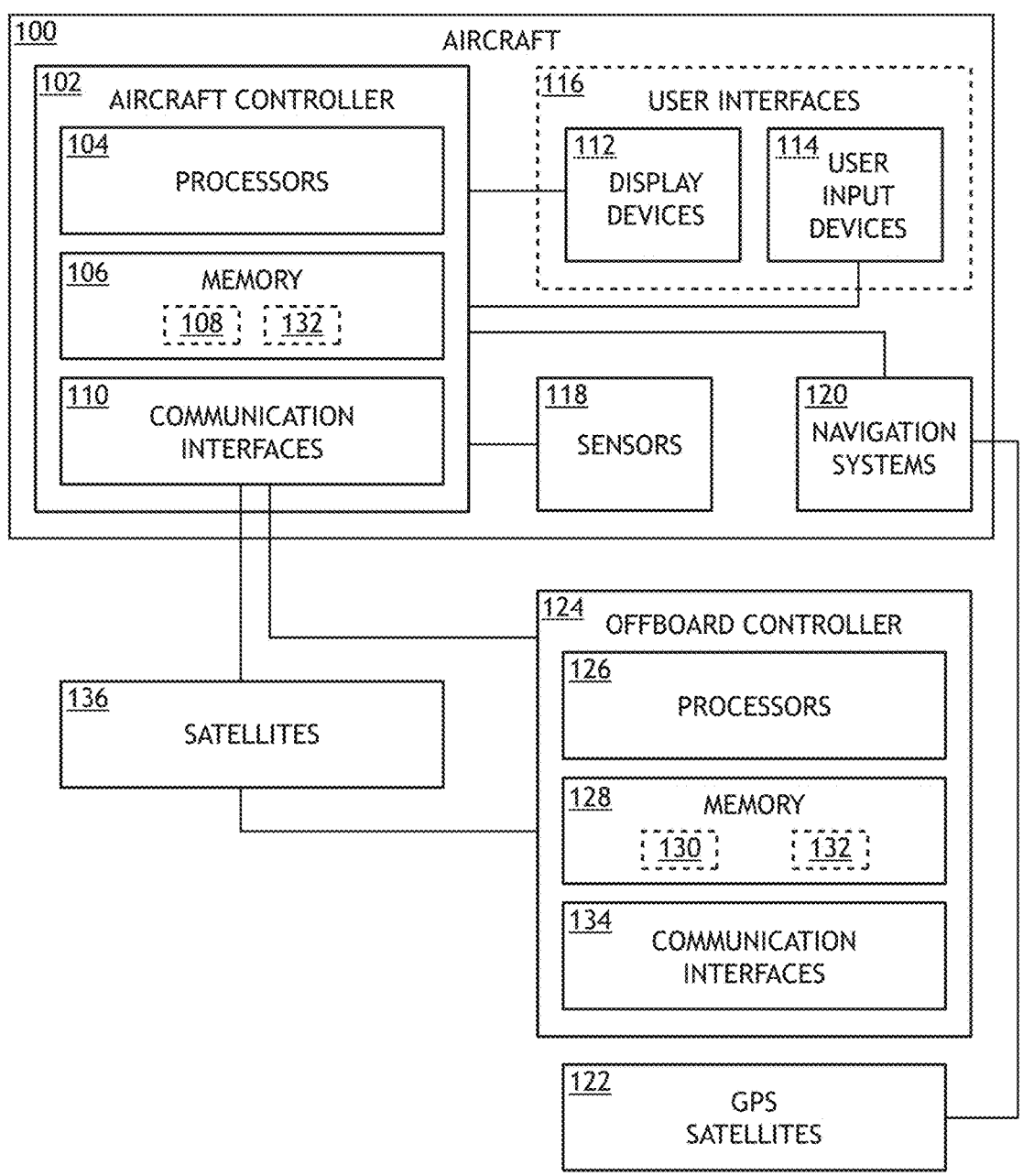
FIG. 1A is a block diagram of a system including an aircraft in which taxi signage generated based on airport surface routing network data may be displayed, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-5 generally illustrate taxi signage generated from airport surface routing network data, in accordance with one or more embodiments of the disclosure.

Figure 1B:
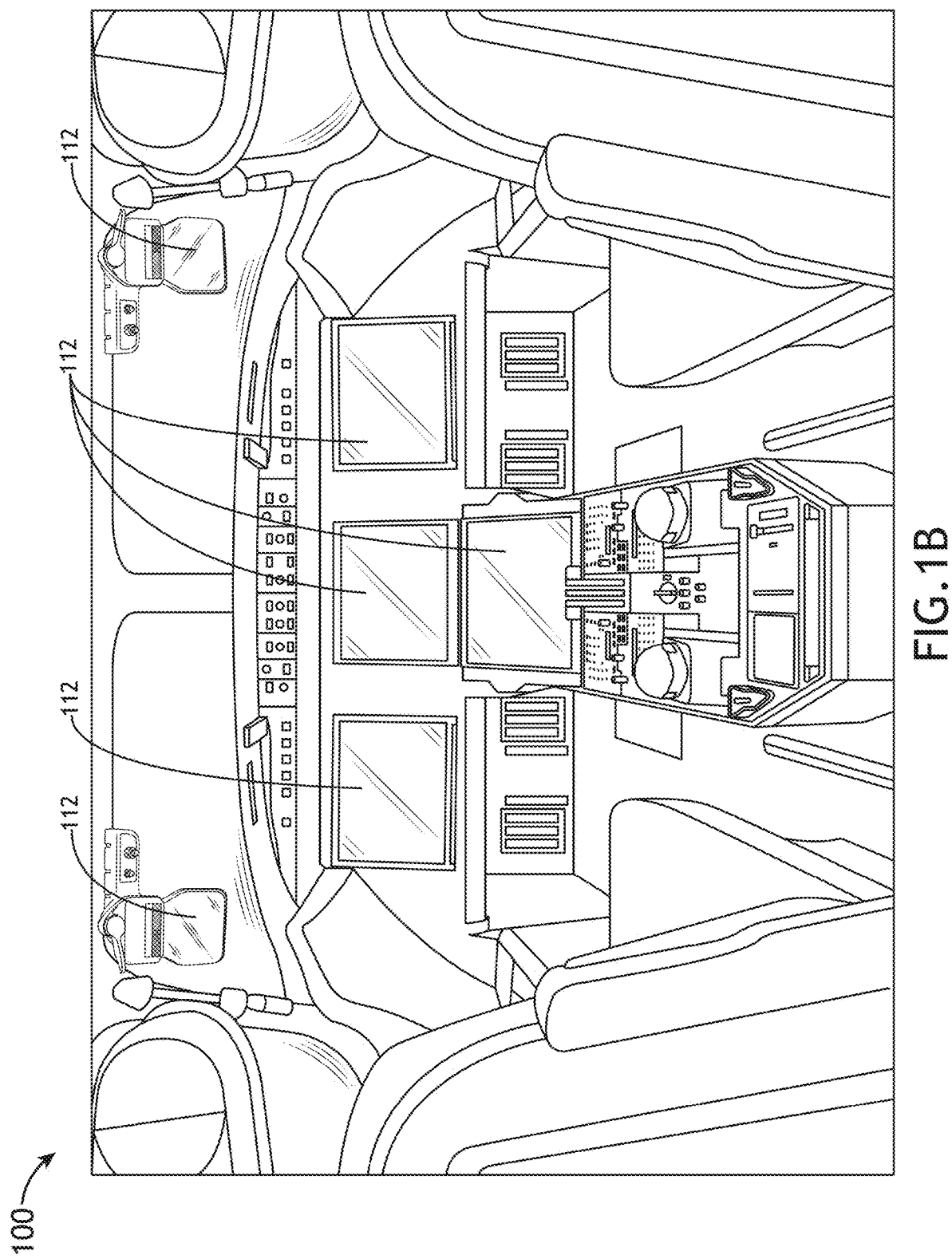
FIG. 1B is an aircraft in which taxi signage generated based on airport surface routing network data may be displayed, in accordance with one or more embodiments of the disclosure.
Figure 1C:
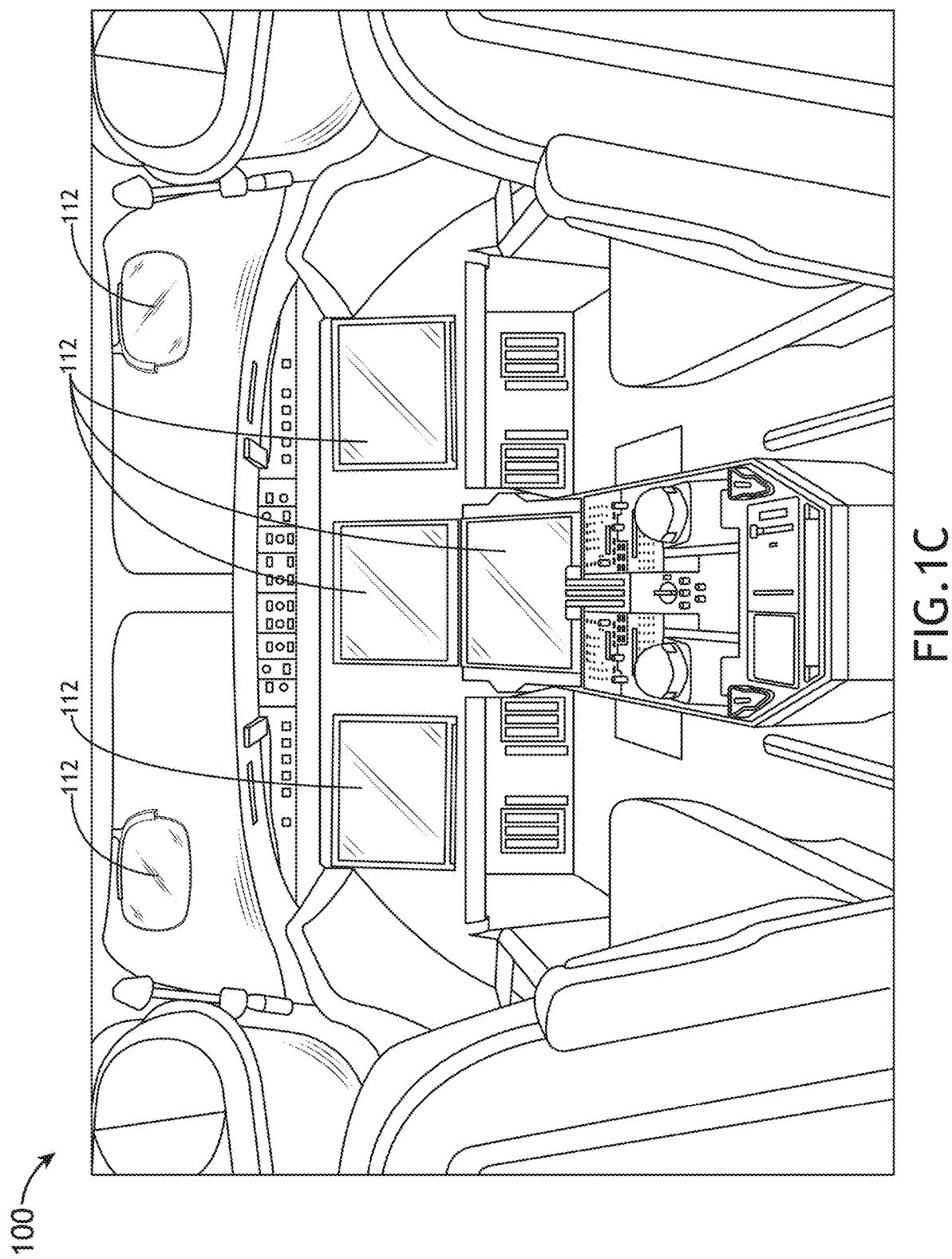
FIG. 1C is an aircraft in which taxi signage generated based on airport surface routing network data may be displayed, in accordance with one or more embodiments of the disclosure.

FIGS. 1A-1C generally illustrate an aircraft 100 in which taxi signage may be generated based on airport surface routing network data and/or displayed, in accordance with one or more embodiments of the disclosure.

Referring now to FIG. 1A, the aircraft 100 may include an aircraft controller 102. The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images (e.g., as part of a Synthetic Vision System, or SVS) and/or two-dimensional images. Referring now to FIGS. 1B and 1C, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), or the like. The one or more display devices 112 may be employed to present flight data including, but not limited to, situational awareness data and/or flight queue data to a pilot or other crew member. For example, the situational awareness data may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124. For example, the one or more offboard controllers 124 may be in possession of an air traffic control tower, in possession of an offboard ground maintenance crew, in possession of a manufacturing line operator, in possession of a quality control tester, or the like.

The one or more offboard controllers 124 may include one or more processors 126, memory 128 configured to store one or more programs instructions 130 and/or one or more databases 132, and/or one or more communication interfaces 134. The one or more databases 132 may be transmitted to the aircraft controller 102.

The aircraft controller 102 and/or the one or more offboard controllers 124 may be coupled (e.g., physically, electrically, and/or communicatively) to one or more satellites 136. For example, the aircraft controller 102 and/or the one or more offboard controllers 124 may be coupled (e.g., physically, electrically, and/or communicatively) to one another via the one or more satellites 136. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 136 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
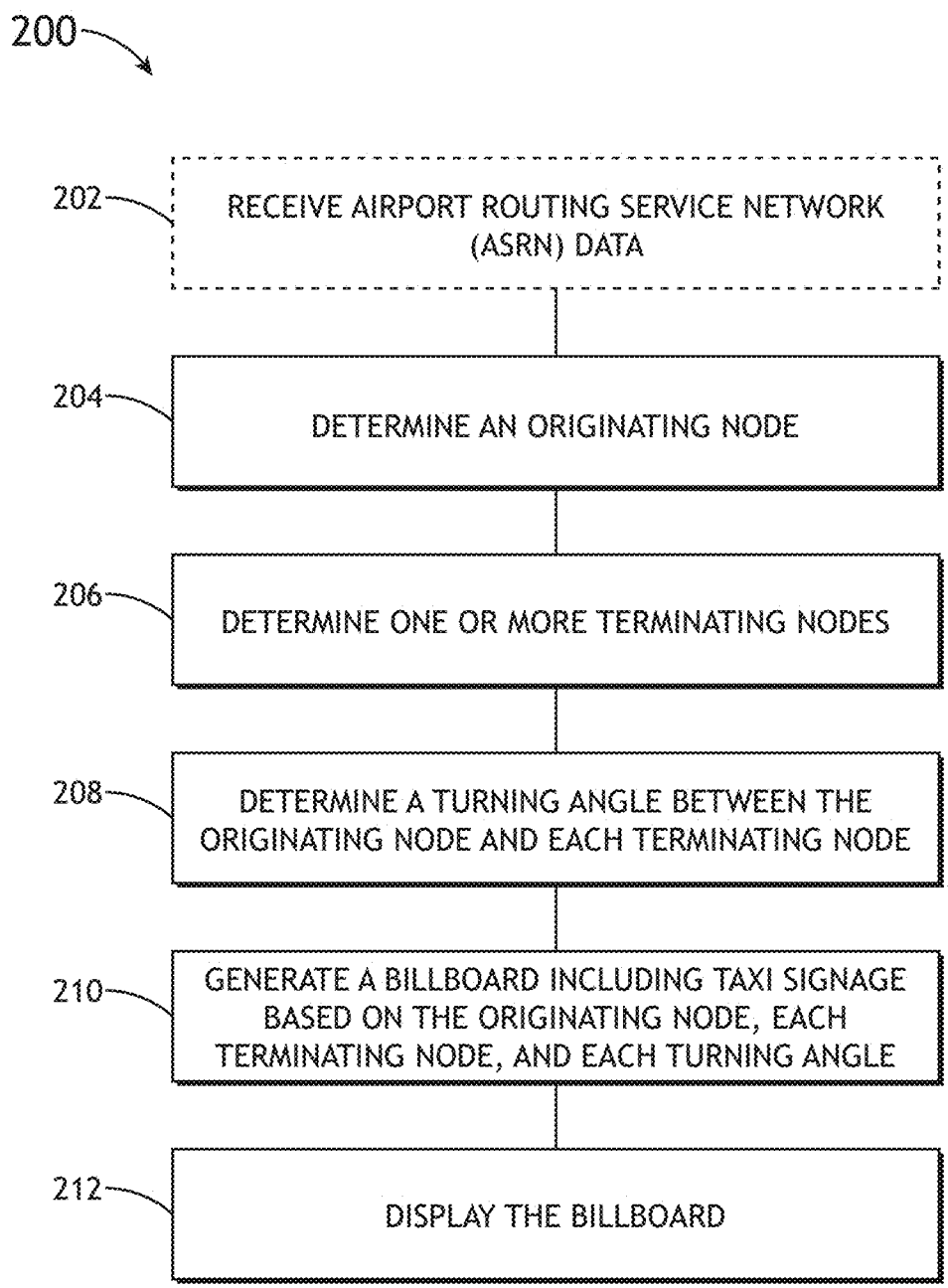
FIG. 2 is a flow diagram of a method or process for generating a billboard including taxi signage based on airport surface routing network data, in accordance with one or more embodiments of the disclosure.
Figure 3:
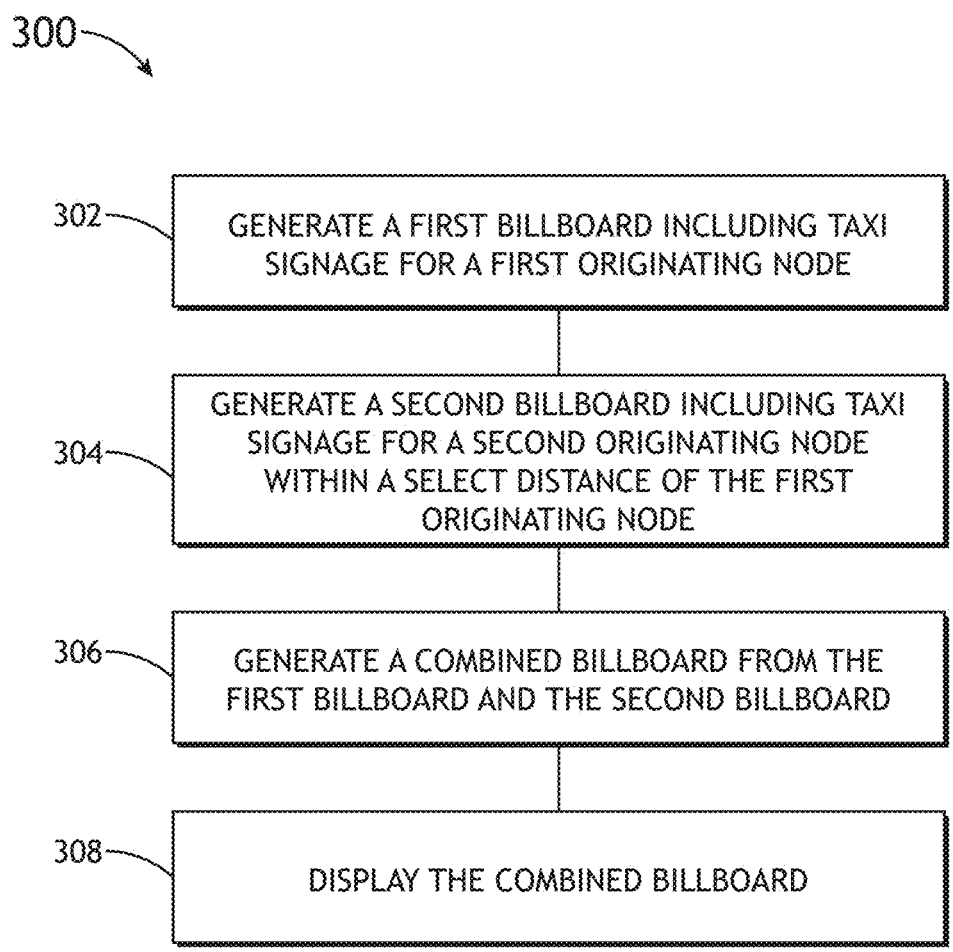
FIG. 3 is a flow diagram of a method or process for generating a combined billboard including taxi signage based on airport surface routing network data, in accordance with one or more embodiments of the disclosure.
Figure 4:
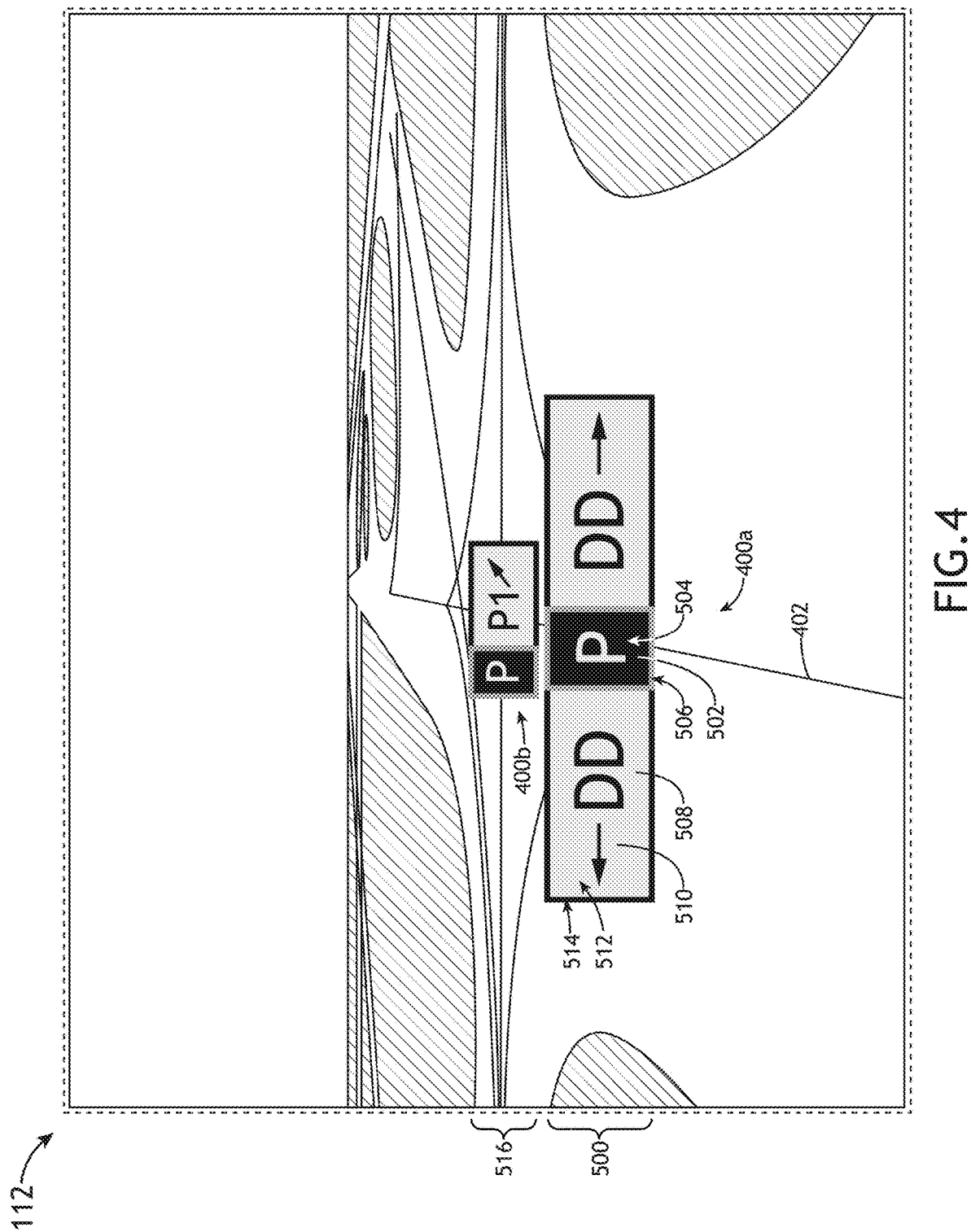
FIG. 4 is a graphical representation of a front view of portions of an avionics display screen showing taxi signage generated from airport surface routing network data, in accordance with one or more embodiments of the disclosure.
Figure 5:
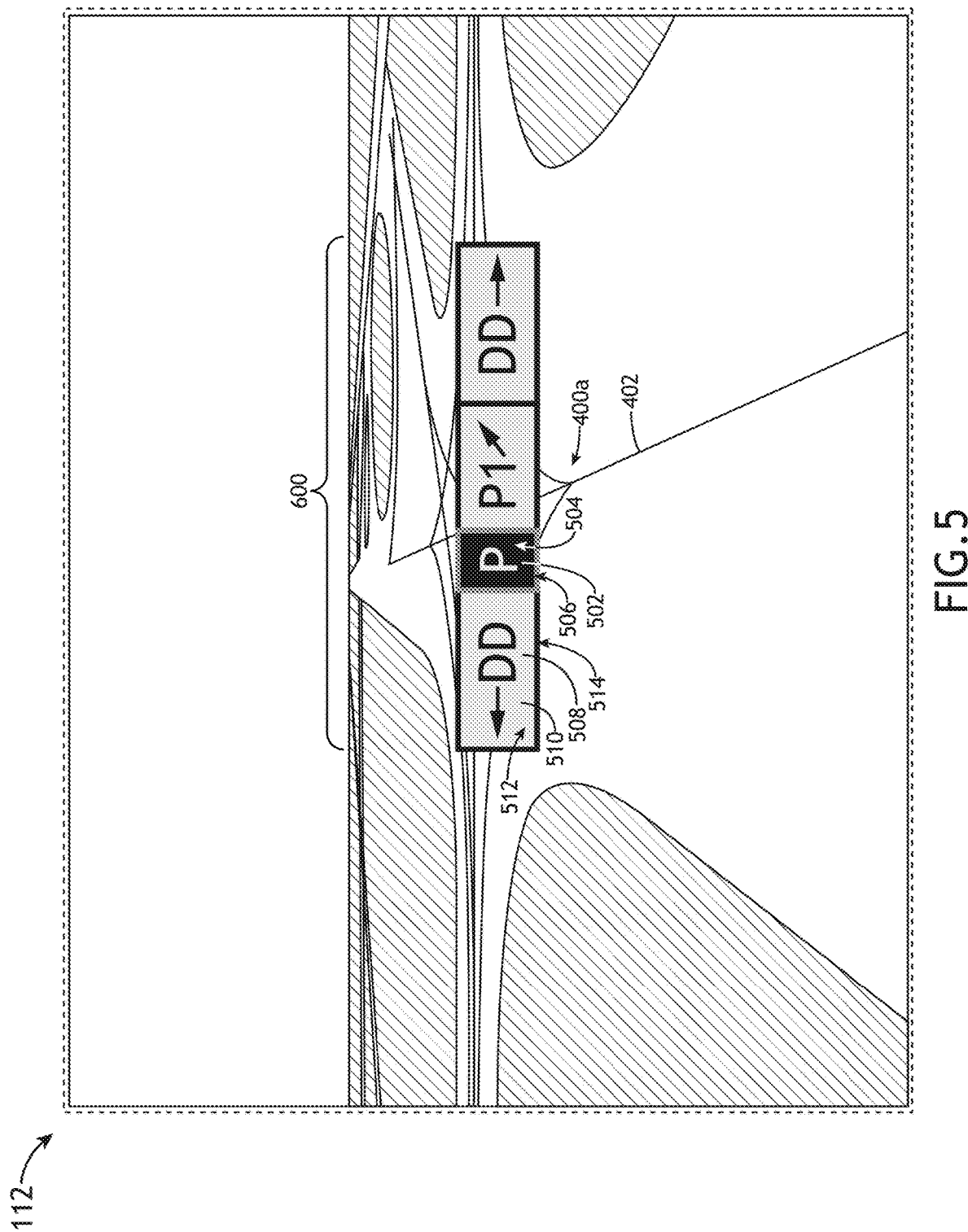
FIG. 5 is a graphical representation of a front view of portions of an avionics display screen showing a combined billboard including taxi signage generated from airport surface routing network data, in accordance with one or more embodiments of the disclosure.

FIGS. 2 and 3 illustrate flow diagrams for generating billboards including taxi signage from airport surface routing network data, in accordance with one or more embodiments of the disclosure. FIGS. 4 and 5 generally illustrate graphical representations of taxi signage generated from airport surface routing network data, in accordance with one or more embodiments of the disclosure.

A low-visibility situation may prevent crew members from being able to see taxi signage at taxiway and runway intersections via line-of-sight through the windows during taxiing. A Taxi Mode for a Synthetic Vision System (SVS) may be employed to assist in determining the location of the aircraft during taxiing. SVS Taxi Mode may provide situational awareness to crew members operating an aircraft by using databases including terrain, obstacle, geo-political, hydrological, or other environment information to generate graphical representations of the surrounding area during taxiing.

As such, it would be desirable to provide taxi signage in SVS Taxi Mode. However, taxi signage is not readily available from database vendors, in part due to the difficulty and cost associated with charting the location of and information contained within the taxi signage for all airfields. For example, satellite imagery may not be able to readily distinguish each sign and its contents, potentially resulting in the need for manual generation of databases including the information.

However, taxi signage in SVS Taxi Mode may still be provided in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), International Civil Aviation Organization (ICAO), or any other standards setting organization or company; the Radio Technical Commission for Aeronautics (RTCA) or any other guidelines agency or organization; or the like.

For example, RTCA DO-272, titled *User Requirements for Aerodrome Mapping Information*, published Sep. 22, 2019, defines an industry-standard set of data (or database) 132 for an Airport Surface Routing Network (ASRN), which is acquired and maintained for every airport. By way of another example, ARINC 816 titled *Embedded Interchange Format for Airport Mapping Database*, published Aug. 31, 2016, includes a database format or packaging provision for the ASRN database 132 defined by RTCA DO-272, the ASRN database 132 being incorporated into ARINC 816. By way of another example, FAA Advisory Circular (AC) No. 150/5340-18G, titled *Standards for Airport Sign Systems*, issued May 10, 2019, and No. 150/5345-44K, titled *Specification for Runway and Taxiway Signs*, issued Oct. 8, 2015, includes standards for the siting and installation of signs, including color and/or arrangement, on airport taxiways and runways. By way of another example, ICAO Annex 14, 5$^{th}$ Edition, titled *Aerodrome Design and Operations*, includes standards for airfield information signs, a companion part to the ICAO Standards for *Holding Position Markings and Mandatory Instructions Signs*. These and other standards should be adhered to when providing the taxi signage in SVS Taxi Mode. As such, it would be desirable to provide taxi signage generated from Airport Surface Routing Network data that incorporates the color scheme and arrangement of contained information set by the various standards outlined above.

It is believed that generating the taxi signage in SVS Taxi Mode for display on the one or more display devices 112 from the ASRN data may result in a readout that is more useful than a simple label and may be easier and/or more intuitive to understand by a crew member than a textual readout.

Referring now to FIG. 2, a method or process 200 for generating taxi signage from airport surface routing network data is disclosed, in accordance with one or more embodiments of the disclosure. The aircraft controller 102 may employ a series of algorithms to generate taxi signage specific to an origination node and one or more edges extending from the origination node to one or more termination nodes (e.g., as illustrated in FIGS. 4 and 5). The series of algorithms may be process steps as defined by the one or more sets of program instructions 108.

In an optional step 202, the aircraft controller 102 may receive airport routing service network (ASRN) data. The aircraft controller 102 may be configured to store the ASRN database 132 (e.g., within memory 106). The ASRN database 132 may be pre-loaded onto the aircraft controller 102 prior to a flight (e.g., between flights, during in-field testing or operation of the aircraft 100, during manufacture and/or factory-floor testing of the aircraft 100, or the like). The aircraft controller 102 may be configured to receive the ASRN database 132 from an offboard controller 124 during a portion of a flight.

The ASRN database 132 may include two or more nodes 400 representing airport movement surfaces (e.g., taxiways, runways, and the like). For example, a node 400 may include identifying properties of the node where it crosses a boundary. The ASRN database 132 may include one or more edges 402 representing curves connecting the surfaces to assist in mapping how the airport movement surfaces are navigable. For example, an edge 402 may generally trace guidance lines on the airport movement surface.

In a step 204, the aircraft controller may determine an origination node. The series of algorithms may determine an origination node of the two or more nodes 400 within a select proximity of a location of the aircraft 100 and a select orientation relative to the heading or bearing of the aircraft 100 on an airport movement surface. For example, the location and/or the heading or bearing of the aircraft 100 on the airport movement surface may be based on information received via an input from the one or more sensors 118 of the aircraft 100, the one or more navigation systems 120 of the aircraft 100, and/or the one or more satellites 136.

In a step 206, the aircraft controller 102 may determine one or more termination nodes. The series of algorithms may trace any edges 402 radiating from the origination node of the two or more nodes 400 to one or more termination nodes of the two or more nodes 400.

In a step 208, the aircraft controller 102 may determine a turning angle between the origination node and each termination node. The series of algorithms may compare information about the origination node of the two or more nodes 400 to information of the one or more termination nodes of the two or more nodes 400 to determine a turning angle for the aircraft 100 based on a comparison of the origination node of the two or more nodes 400 and each of the one or more termination nodes of the two or more nodes 400. For example, a particular turning angle may be determined based on a delta of a slope of angle of the edge 402 at the origination node of the two or more nodes 400 and a slope of angle of the edge 402 at a particular termination node of the two or more nodes 400. The delta between the two slopes of angle may provide a measure of how far the aircraft 100 must turn to enter the portion of the airport movement surface corresponding to the edge 402.

In a step 210, the aircraft controller 102 may generate taxi signage based on the origination node, each termination node, and/or each turning angle.

The series of algorithms may determine one or more alphanumeric characters from the ASRN database 132 based on the origination node. For example, the one or more alphanumeric characters may be defined in one or more standards (e.g., the FAA Advisory *Circulars* and/or the ICAO guidance, as provided above).

The series of algorithms may determine one or more arrows with a direction representing the turning angle. For example, the graphical representation of the one or more arrows may be defined in one or more standards (e.g., the FAA Advisory *Circulars* and/or the ICAO guidance, as provided above).

The series of algorithms may determine one or more alphanumeric characters from the ASRN database 132 to pair with the determined one or more arrows based on the one or more termination nodes. For example, the one or more alphanumeric characters may be defined in one or more standards (e.g., the FAA Advisory *Circulars* and/or the ICAO guidance, as provided above).

The series of algorithms may determine one or more symbols (e.g., runway-holding position markings, or the like) from the ASRN database 132 to pair with the determined one or more arrows and/or the one or more alphanumeric characters. For example, the one or more symbols may be defined in one or more standards (e.g., the FAA Advisory *Circulars* and/or the ICAO guidance, as provided above).

The series of algorithms may generate taxi signage including one or more termination portions/blocks/signs and/or an origination portion/block/sign. The one or more termination portions may include information about the one or more termination nodes (e.g., colors, alphanumeric characters, arrows, symbols, or the like). The origination portion may include information related to the origination node (e.g., colors and alphanumeric characters, or the like).

The series of algorithms may generate the taxi signage in a particular order from left to right. For example, the particular order may be defined in one or more standards (e.g., the FAA Advisory *Circulars* and/or the ICAO guidance, as provided above). For instance, the one or more termination portions may surround the origination portion, such that the generated taxi signage may include any directions or pathways extending from a location or current pathway (e.g., the information in the one or more termination portions) starting from the bottom-left relative to the aircraft through the bottom right relative to the aircraft, tracking in a clockwise direction through the location or current pathway (e.g., the information in the origination portion). The location or current pathway may represent the origination node of the two or more nodes 400 the aircraft 100 is approaching for a particular edge 402. The directions or pathways extending from the location or current pathway may represent a particular termination node of the two or more nodes 400 coupled to the origination node of the of the two or more nodes 400 via a particular edge 402.

The series of algorithms may determine a color for the one or more arrows, the one or more alphanumeric characters, and/or the one or more symbols on the generated taxi signage. For example, the color may be defined in one or more standards (e.g., the FAA Advisory *Circulars* and/or the ICAO guidance, as provided above). The color may be dependent on the origination node, the location or current pathway of the aircraft 100, and/or a direction or pathway extending from the location or current pathway of the aircraft 100. For example, the location or current pathway may be indicated by one or more yellow alphanumeric characters set within or surrounded by a black space with a yellow border on the generated taxi signage. By way of another example, the directions or pathways extending from the location or current pathway may be indicated by one or more black alphanumeric characters and/or one or more arrows set within or surrounded by a yellow space with a black border.

The generated taxi signage may be anchored to the origination node 400. For example, the generated taxi signage may slide in a direction opposite the turning of the aircraft 100 (e.g., slides to the left when the aircraft 100 turns right, or the like). By way of another example, the generated taxi signage may be substantially opaque as the aircraft 100 approaches the origination node 400, and/or may fade out as the aircraft 100 enters the intersection of the edges 402 coupled to the origination node 400.

A second billboard including taxi signage may be generated and may fade into view while a first billboard including taxi signage fades out of view, the selection and/or fade-in time of the second billboard including taxi signage being dependent on a possible turning radius and/or heading or bearing. For example, the fading may be dependent on a comparison between the heading or bearing of the aircraft 100 and the slope of angle/gradient for the origination node to determine an alignment with a particular direction. For instance, the fading may be dependent on the alignment falling within a tolerance band (e.g., +/−10 degrees), with the fading occurring when the alignment falls outside the tolerance band. It is noted herein that the generated billboard including signage may immediately appear and/or disappear instead of fading in and/or out.

The generated taxi signage may be dependent on the position of an aircraft 100 relative to the origination node of the two or more nodes 400. For example, the generated taxi signage may face the aircraft 100. By way of another example, the generated taxi signage may grow in size as the aircraft 100 approaches the origination node of the two or more nodes 400.

Although embodiments of the present disclosure state that the generated taxi signage may be anchored to a node, it is noted herein the generated taxi signage may be moveable on the one or more display devices 112, either indirectly via the one or more user input devices 114 and/or with direct contact via the one or more display devices 112. For example, the taxi signage may be placeable in a message box, title bar, or another location on the one or more display devices 112, an improvement over the constrained nature of the physical placement on taxi signage on the airport movement surfaces.

Therefore, the above description should not be interpreted as a limitation on the scope of the present disclosure but merely an illustration.

In an optional step 212, the taxi signage may be displayed. The combined billboard including the taxi signage may be displayed on the one or more display devices 112 of the aircraft 100. The taxi signage may be included on a billboard positioned proximate to the origination node of the two or more nodes 400 of the airport movement surface displayed on the one or more display devices 112.

The one or more nodes 400 may be positioned on the airport movement surface such that they do not share the exact same intersection, but instead combine to represent a complex intersection of nodes within pre-defined proximity of one another. As such, it may be desirable to display multiple, separate billboards including taxi signage generated based on the complex intersection of nodes 400 simultaneously.

It is noted herein, however, that the displaying of multiple billboards may result in cluttered display devices 112 including redundant signage, an obscuration of other displayed features, and other general difficulties of interpreting the generated taxi signage and surrounding environment. Therefore, the multiple taxi signage may need to be consolidated into a single combined billboard that is easy to read and interpret, minimizing crew member workload and guesswork when interpreting the signage.

Referring now to FIG. 3, a method or process 300 for generating a combined billboard including taxi signage based on airport surface routing network data is disclosed, in accordance with one or more embodiments of the disclosure.

In a step 302, a first billboard including taxi signage for a first origination node may be generated. The first billboard may be generated via one or more steps of the process 200, as previously described above. For example, the first billboard may be generated following the ASRN data being received. By way of another example, a first origination node may be determined. By way of another example, one or more termination nodes may be determined. By way of another example, a turning angle between the first origination node and each termination node may be determined. By way of another example, the first billboard including taxi signage based on the first origination node, each termination node, and/or each turning angle may be generated. The first billboard may be displayed on the one or more display devices 112.

In a step 304, a second billboard including taxi signage for a second origination node within a select distance of the first origination node may be generated. The second billboard may be generated via one or more steps of the process 200, as previously described above. For example, the second billboard may be generated following the ASRN data being received. By way of another example, a second origination node may be determined. By way of another example, one or more termination nodes may be determined. By way of another example, a turning angle between the second origination node and each termination node may be determined. By way of another example, the second billboard including taxi signage based on the first origination node, each termination node, and/or each turning angle may be generated. The second billboard may be displayed on the one or more display devices 112.

In a step 306, a combined billboard may be generated from the taxi signage included in the first billboard and the taxi signage included in the second billboard. The series of algorithms may identify whether the second origination node is within the select distance of the first origination node within a pre-determined tolerance. The series of algorithms may identify whether the second origination node and the first origination node are similarly aligned within a pre-determined tolerance (e.g., includes similar origination node edge slopes).

The series of algorithms may combine the first billboard including taxi signage for the first origination node and the second billboard including taxi signage for the second origination node if the first origination node and the second origination node are within the select distance and are similarly aligned. The series of algorithms may determine whether the first board and the second billboard include redundant or repeated information (e.g., current location or pathway), and consolidates the combined billboard to remove the redundant or repeated information.

The series of algorithms may automatically review and combine the first billboard including taxi signage for the first origination node and the billboard including taxi signage for the second origination node. For example, the series of algorithms may automatically review and combine the first billboard including taxi signage for the first origination node and the second billboard including taxi signage for the second origination node into the combining billboard. By way of another example, the series of algorithms may be configured to generate the combined billboard directly from the taxi signage for the first origination node and the taxi signage for the second origination node, without generating and combining the first billboard and the second billboard.

The series of algorithms may combine the first billboard including taxi signage for the first origination node and the billboard including taxi signage for the second origination node following an input being received from the one or more display devices 112 and/or the one or more user input devices 114. For example, the first billboard and the second billboard may be displayed on the one or more display devices 112 as separate billboards. Upon a receipt of an input being received from the one or more display devices 112 and/or the one or more user input devices 114, the series of algorithms may generate and display the combined billboard.

It is noted herein the series of algorithms are not limited to combining the first billboard and the second billboard, but instead may combine any number of billboards for any number of origination nodes that are within the select distance and are similarly aligned.

In a step 308, the combined billboard may be displayed. The combined billboard may be displayed on the one or more display devices 112 of the aircraft 100. The taxi signage may be a billboard proximate to the origination node 400 of the airport movement surface displayed on the one or more display devices 112.

The combined billboard may be positioned over either the first origination node or the second origination node. The combined billboard may be positioned in a space between the first origination node and the second origination node.

In one example, where an aircraft 100 is approaching an origination node 400a and an origination node 400b as illustrated in FIG. 4, the series of algorithms may initially generate taxi signage billboards 500 and 516. The taxi signage billboards 500, 516 may be generated for the origination nodes 400a, 400b on the display device 112, respectively. The taxi signage billboards 500, 516 may include an origination portion with one or more yellow alphanumeric characters 502 indicating a location or current pathway of the aircraft 100, set within or surrounded by a black space 504 with a yellow border 506. The taxi signage billboards 500, 516 may include one or more termination portions with one or more black alphanumeric characters 508 and/or one or more black arrows 510 indicating directions or pathways extending from the location or current pathway of the aircraft 100, set within or surrounded by a yellow space 512 with a black border 514. The information on the taxi signage billboards 500, 516 may be listed from bottom left to bottom right relative to the position of the aircraft 100 tracking in a clockwise direction through the location or current pathway.

In another example, where an aircraft 100 is approaching an origination node 400b as illustrated in FIG. 4, the series of algorithms may generate a combined taxi signage billboard 600 as illustrated in FIG. 5. The combined taxi signage billboard 600 may be generated for the origination node 400 on the display device 112. The combined taxi signage billboard 600 may include an origination portion with one or more yellow alphanumeric characters 502 indicating a location or current pathway of the aircraft 100, set within or surrounded by a black space 504 with a yellow border 506. The taxi signage billboard 600 may include one or more termination portions with one or more black alphanumeric characters 508 and/or one or more black arrows 510 indicating directions or pathways extending from the location or current pathway of the aircraft 100, set within or surrounded by a yellow space 512 with a black border 514. The information on the combined taxi signage billboard 600 may be listed from bottom left to bottom right relative to the position of the aircraft 100 tracking in a clockwise direction through the location or current pathway.

It is noted herein that the generated taxi signage is not limited to providing information about locations or current pathways and/or directions or pathways extending from the locations or current pathways relative to the aircraft 100. For example, the generated taxi signage may indicate mandatory instructions. For instance, the mandatory instructions may include one or more white alphanumeric characters set within or surrounded by a red space on the generated taxi signage. Therefore, the above description should not be interpreted as a limitation on the scope of the present disclosure but merely an illustration.

In addition, it is noted herein the processes 200 and 300 are not limited to the steps and/or sub-steps provided. The processes 200 and 300 may include more or fewer steps and/or sub-steps. The processes 200 and 300 may perform the steps and/or sub-steps simultaneously. The processes 200 and 300 may perform the steps and/or sub-steps sequentially, including in the order provided or an order other than provided. Therefore, the above description should not be interpreted as a limitation on the scope of the disclosure but merely an illustration.

Further, it is noted herein that the present disclosure is not limited to generating taxi signage from ASRN data. For example, taxi guidance instructions, textual readouts of upcoming turns on an airport movement surface, or the like may be generated from the ASRN data via the series of algorithms and provided via the one or more display devices 112. Therefore, the above description should not be interpreted as a limitation on the scope of the present disclosure but merely an illustration.

Although embodiments of the present disclosure are directed to the aircraft controller 102 receiving the ASRN database 132 and generating taxi signage via a series of algorithms that are process steps as defined by the one or more sets of program instructions 108, it is noted herein that the one or more offboard controllers 124 may be configured to generate taxi signage via one or more steps of the processes 200 and 300, employing a series of algorithms that are process steps as defined by the one or more sets of program instructions 130, before transmitting the generated taxi signage to the aircraft controller 102 for display on the one or more display devices 112. Therefore, the above description should not be interpreted as a limitation on the scope of the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
a controller configured to receive airport surface routing network data, generate first taxi signage for a first origination node, generate second taxi signage for a second origination node, identify the first origination node and the second origination node are within a distance, and generate combined taxi signage when the distance is within a pre-determined tolerance, the combined taxi signage generated from the first taxi signage and the second taxi signage,
the first taxi signage for the first origination node generated from:
  the first origination node stored within the airport surface routing network data, the first origination node being within a select proximity and a select orientation relative to a location of the aircraft;
  at least a first termination node stored within the airport surface routing network data, the at least the first termination node being coupled to the first origination node via at least a first edge, the at least the first edge extending from the first origination node to the at least one termination node, the at least the first edge being stored within the airport surface routing network data; and
  a first turning angle determined based on a comparison between the first origination node and the at least the first termination node; and
the second taxi signage for the second origination node generated from:
  the second origination node stored within the airport surface routing network data, the second origination node being within the select proximity and the select orientation relative to the location of the aircraft;
  at least a second termination node stored within the airport surface routing network data, the at least the second termination node being coupled to the second origination node via at least a second edge, the at least the second edge extending from the origination node to the at least one second termination node, the at least the second edge being stored within the airport surface routing network data; and
  a second turning angle determined based on a comparison between the second origination node and the at least the second termination node, and
a display device of an aircraft, the display device configured to receive the combined taxi signage from the controller and display a combined billboard, the combined taxi signage being included in the combined billboard displayed on the display device of the aircraft.

2. A method comprising:
receiving, by an aircraft controller, airport surface routing network data;
generating, by the aircraft controller, first taxi signage for a first origination node, comprising:
determining the first origination node stored within airport surface routing network data, the first origination node being within a select proximity and a select orientation relative to a location of an aircraft;
determining at least a first termination node stored within the airport surface routing network data, the at least the first termination node being coupled to the first origination node via at least a first edge, the at least the first edge extending from the first origination node to the at least the first termination node, the at least the first edge being stored within the airport surface routing network data; and
determining a first turning angle based on a comparison between the first origination node and the at least the first termination node;
generating, by the aircraft controller, second taxi signage for a second origination node, comprising:
determining the second origination node stored within the airport surface routing network data, the second origination node being within the select proximity and the select orientation relative to the location of the aircraft;
determining at least a second termination node stored within the airport surface routing network data, the at least the second termination node being coupled to the second origination node via at least a second edge, the at least one second edge extending from the second origination node to the at least one second termination node, the at least the second edge being stored within the airport surface routing network data; and
determining a second turning angle based on a comparison between the second origination node and the at least the second termination node; and
identifying, by the aircraft controller, the first origination node and the second origination node are within a distance;
generating, by the aircraft controller, a combined taxi signage from the first taxi signage for the first origination node and the second taxi signage for the second origination node when the distance is within a predetermined tolerance; and
displaying a combined billboard including the combined taxi signage on a display device of the aircraft.

3. The method of claim 2, the generating, by the aircraft controller, the combined taxi signage comprising:
automatically combining the first taxi signage for the first origination node and the second taxi signage for the second origination node.

4. The method of claim 2, the method further comprising:
displaying a first billboard including the first taxi signage for the first origination node on the display device of the aircraft; and
displaying a second billboard including the second taxi signage for the second origination node on the display device of the aircraft.

5. The method of claim 4, the generating, by the aircraft controller, the combined taxi signage comprising:
combining the first taxi signage for the first origination node and the second taxi signage for the second origination node following the aircraft controller receiving an input from a user via at least one input device of the aircraft.

6. The method of claim 2, the first origination node and the second origination node being oriented along a current pathway as defined by a heading of the aircraft.

7. The method of claim 6, the combined taxi signage including an origination portion, the origination portion including at least one alphanumeric character having a first color set within a space having a second color, the space having the second color being bounded by an outline having the first color.

8. The method of claim 7, the at least one alphanumeric character corresponding to information about the second origination node stored within the airport surface routing network data.

9. The method of claim 7, the at least one alphanumeric character corresponding to information about the first origination node stored within the airport surface routing network data.

10. The method of claim 7, the combined taxi signage including at least a first termination portion, the at least the first termination portion including the at least one alphanumeric character having the second color set within a space having the first color, the space having the first color being bounded by an outline having the second color.

11. The method of claim 10, the at least one alphanumeric corresponding to information about the at least the first termination node stored within the airport surface routing network data.

12. The method of claim 10, the at least one alphanumeric corresponding to information about the at least the second termination node stored within the airport surface routing network data.

13. The method of claim 10, the combined taxi signage including at least one arrow set within the space of the first color, the at least one arrow having the second color.

14. The method of claim 13, wherein the aircraft controller selects a direction of the at least one arrow based on the first turning angle.

15. The method of claim 13, wherein the aircraft controller selects a direction of the at least one arrow based on the second turning angle.

* * * * *